US009569495B2

(12) United States Patent
Beavin et al.

(10) Patent No.: US 9,569,495 B2
(45) Date of Patent: *Feb. 14, 2017

(54) FEEDBACK MECHANISM PROVIDING ROW-LEVEL FILTERING EARLIER IN A PLAN

(71) Applicant: International Business Machines Corporation, Armonk, NY (US)

(72) Inventors: Thomas A. Beavin, Milpitas, CA (US); Garth A. Dickie, Framingham, MA (US); Ian R. Finlay, Uxbridge (CA); Terence P. Purcell, Springfield, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,527

(22) Filed: Apr. 7, 2015

(65) Prior Publication Data

US 2016/0055208 A1 Feb. 25, 2016

Related U.S. Application Data

(63) Continuation of application No. 14/465,120, filed on Aug. 21, 2014.

(51) Int. Cl.
*G06F 7/00* (2006.01)
*G06F 17/30* (2006.01)

(52) U.S. Cl.
CPC ... *G06F 17/30466* (2013.01); *G06F 17/30398* (2013.01); *G06F 17/30454* (2013.01); *G06F 17/30477* (2013.01); *G06F 17/30483* (2013.01)

(58) Field of Classification Search
CPC ............ G06F 17/30463; G06F 17/30454; G06F 17/30477; G06F 17/30398
See application file for complete search history.

(56) References Cited

U.S. PATENT DOCUMENTS 6,134,540 A * 10/2000 Carey ............... G06F 17/30471
6,567,802 B1 * 5/2003 Popa ................ G06F 17/30463
7,174,331 B1 * 2/2007 Luo ................. G06F 17/30498
(Continued)

OTHER PUBLICATIONS

Chaudhuri et al.; "Factorizing Complex Predicates in Queries to Exploit Indexes", SIGMOD'03 Proceedings of the 2003 ACM SIGMOD International Conference on Management of Data, Jun. 9-12, 2003, pp. 361-372.
(Continued)

*Primary Examiner* — Charles Lu
(74) *Attorney, Agent, or Firm* — Mohammed Kashef; Edell, Shapiro & Finnan, LLC (57) ABSTRACT

Methods, systems, and computer readable media of executing a database query are provided. One or more predicates are generated based on implicit filtering present within the database query, wherein each predicate specifies a condition with respect to a predicate value. An access path is selected for the database query based on the one or more predicates and the one or more predicates are integrated within the selected access plan. The database query is executed in accordance with the selected access plan. At least one predicate value based on data accessed is updated, as the database query is being executed, to increase filtering of data during remaining execution of the database query.

7 Claims, 9 Drawing Sheets

(56) References Cited

U.S. PATENT DOCUMENTS

| | | |
|---|---|---|
| 7,346,601 B2 | 3/2008 | Chaudhuri et al. |
| 7,376,638 B2 | 5/2008 | Gordon |
| 7,792,825 B2 | 9/2010 | Hoshikawa et al. |
| 7,860,858 B2 | 12/2010 | Brown et al. |
| 7,953,726 B2 | 5/2011 | Purcell |
| 8,051,069 B2 | 11/2011 | Johnson et al. |
| 8,239,373 B2 | 8/2012 | Sthanikam et al. |
| 8,645,356 B2 | 2/2014 | Bossman et al. |
| 8,688,682 B2 | 4/2014 | Faunce et al. |
| 2005/0055381 A1 | 3/2005 | Ganesh et al. |
| 2006/0259457 A1* | 11/2006 | Muras ............... G06F 17/30433 |
| 2009/0063458 A1 | 3/2009 | Beavin et al. |
| 2009/0070313 A1* | 3/2009 | Beyer ............... G06F 17/30386 |
| 2011/0082855 A1 | 4/2011 | Al-Omari et al. |
| 2013/0138630 A1 | 5/2013 | Yang et al. |
| 2014/0052743 A1 | 2/2014 | Schauer et al. |

OTHER PUBLICATIONS

Ip.com et al.; "Access Path Selection in a Relational Database Management System", IPCOM000067742D, Feb. 20, 2005, pp. 1-5.
Ip.com et al.; "Adaptive Access Plan for Select Queries With Multiple Predicates", IPCOM000099329D, Mar. 14, 2005, pp. 1-6.
Colgan, Maria; "The Oracle Optimizer Explain the Explain Plan", An Oracle White Paper, May 2011, pp. 1-30.
List of IBM Patents or Patent Applications Treated as Related, Apr. 7, 2015.

* cited by examiner

FEEDBACK MECHANISM PROVIDING ROW-LEVEL FILTERING EARLIER IN A PLAN

CROSS-REFERENCE TO RELATED APPLICATIONS

This application is a continuation of U.S. patent application Ser. No. 14/465,120, entitled "FEEDBACK MECHANISM PROVIDING ROW-LEVEL FILTERING EARLIER IN A PLAN" and filed Aug. 21, 2014, the disclosure of which is incorporated herein by reference in its entirety.

BACKGROUND

Present invention embodiments relate to reducing computational workload, and more specifically, to reducing computational workload by deriving filtering predicates based on evaluated data. As the query is being executed, feedback may be provided to update the predicate value in order to further improve data filtering.

Structured Query Language (SQL) queries containing operators such as MIN/MAX, DISTINCT/GROUP BY, or ORDER BY and FETCH FIRST perform optimally when indexing data provides order to the data set such that the first n rows or the minimum or maximum can be found quickly. Additionally, when order is provided, duplicates are usually stored consecutively, and de-duplication is simplified.

When data is unsorted, current techniques no longer perform optimally. Relational database management systems (RDBMSs), although having the capability to perform sort operations, may need to process the full set of data and potentially perform a computationally expensive sort operation, in order to process a query.

SUMMARY

According to an embodiment of the present invention, methods, systems, and computer readable media of executing a database query are provided. One or more predicates are generated based on filtering present within the database query, wherein each predicate specifies a condition with respect to a predicate value. An access path is selected for the database query based on the one or more predicates and the one or more predicates are integrated within the selected access plan. The database query is executed in accordance with the selected access plan. At least one predicate value based on data accessed is updated, as the database query is being executed, to increase filtering of data during remaining execution of the database query.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

Generally, like reference numerals in the various figures are utilized to designate like components.

DETAILED DESCRIPTION

When indexing provides order within a set of data, existing query optimization solutions may be used to reduce associated processing from executing queries. However, when order is not provided, then a RDBMS may need to process and potentially sort the full result set in order to obtain the query result.

Present invention embodiments provide a benefit by reducing the amount of processing required to return a result. For example, present invention embodiments provide a method that derives filtering predicates by partially executing a query and examining the first 'n' qualified rows in a corresponding result set. By providing feedback to update one or more predicate values as the database query is being executed, computational workload may be reduced. Additionally, such techniques allow rows to be eliminated from being sent into a sort process at an earlier stage in query processing.

Predicates may be derived by first partially executing the query, and then, applying the results of the partially executed query to update the predicate value and reduce the remaining work to be done when executing the remainder of the query. As execution of the query proceeds, these derived filtering predicates are likely to become increasingly selective and even more effective at reducing the remaining workload. While the techniques disclosed herein apply to queries involving returning a unique result, finding a minimum/maximum, or returning the first 'n' rows in a requested order, these techniques are not intended to be limited to such embodiments.

Accordingly, computational workload may be reduced and speed of returning results may be improved by the techniques presented herein. Additionally, present invention embodiments provide techniques for determining how derived filtering predicates can be factored into an access path selection process in order to maximize computational effectiveness.

Figure 1:
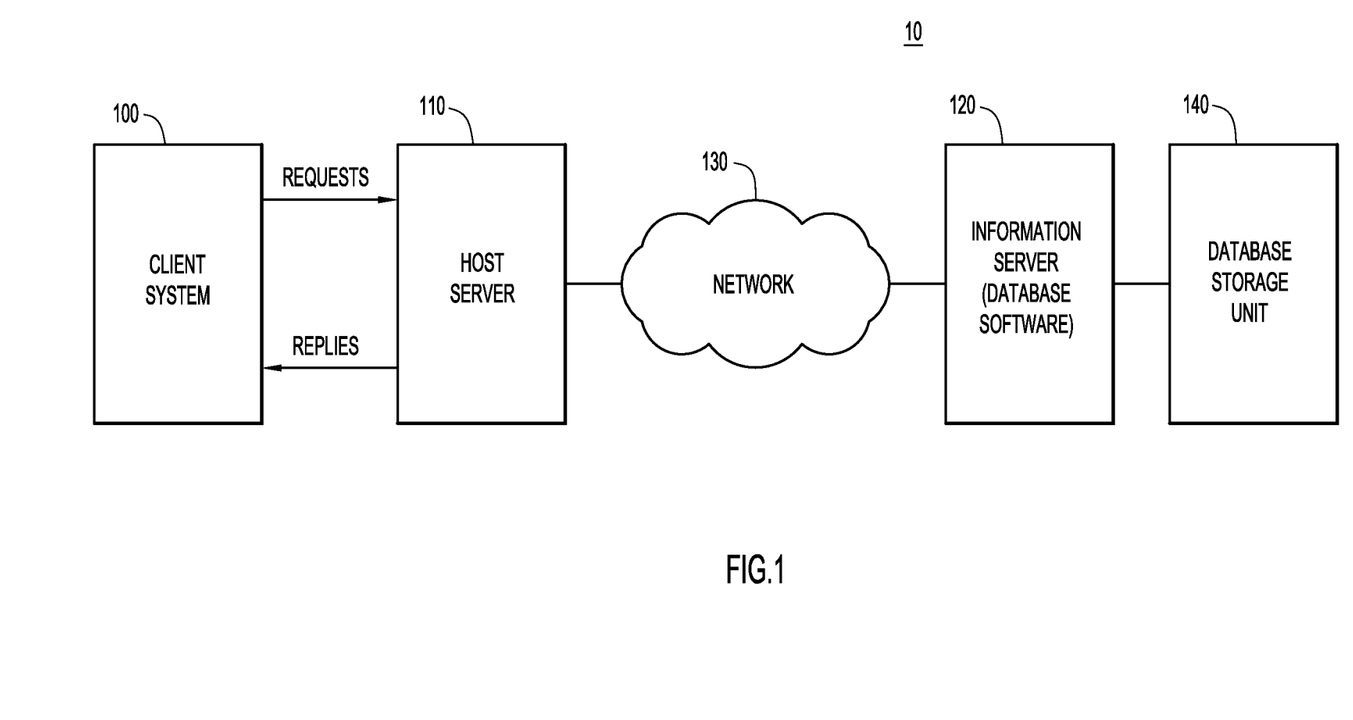
FIG. 1 is an illustration of an example computing environment for use with an embodiment of the present invention.

An example computing environment 10 for use with present invention embodiments is illustrated in FIG. 1. Specifically, the environment includes one or more server systems 110 and 120, and one or more client or end-user systems 100. Server systems 110 and 120 and client systems 100 may be remote from each other and communicate over a network 130. The network may be implemented by any number of any suitable communications media (e.g., wide area network (WAN), local area network (LAN), Internet, Intranet, etc.). Alternatively, server systems 110 and 120 and client systems 100 may be local to each other, and communicate via any appropriate local communication medium (e.g., local area network (LAN), hardwire, wireless link, Intranet, etc.).

Client systems 100 enable users to submit documents (e.g., documents for document collections, documents for analysis, etc.) to server systems 110 and 120 for storage in one or more database storage units 140. The server systems may include a module to determine how to distribute data across one or more storage units 140.

In some embodiments, a database system may store various information corresponding to characteristics of the stored data in storage units 140. The database system may be implemented by any conventional or other database or storage unit, may be local to or remote from server systems 110 and 120 and client system 100, and may communicate via any appropriate communication medium (e.g., local area network (LAN), wide area network (WAN), Internet, hardwire, wireless link, Intranet, etc.).

The client systems may present a graphical user (e.g., GUI, etc.) or other interface (e.g., command line prompts, menu screens, etc.) to solicit information from users pertaining to the desired documents and analysis, and may provide reports including analysis results (e.g., query results, etc.).

Server systems 110 and 120 and client systems 100 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Within this disclosure, it is noted that the term "sort" is intended to comprise both sorting and hashing techniques for those cases where either technique is applicable. For example, in cases involving GROUP BY or DISTINCT operations, the RDBMS may utilize sorting or hashing techniques to perform grouping or duplicate detection operations. These types of operations are referred to as "sorting" operations herein.

Figure 2:
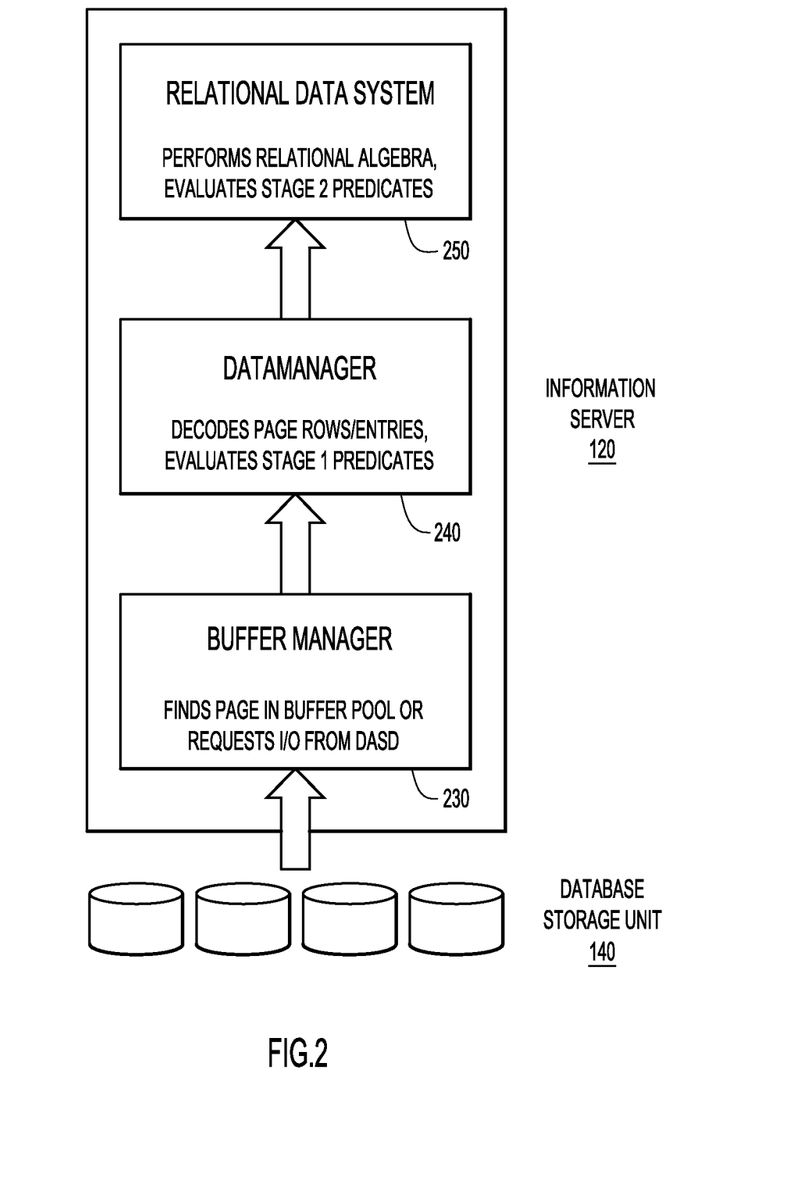
FIG. 2 is an illustration of an information server retrieving information from one or more database storage units according to an embodiment of the present invention.

Referring to FIG. 2, RDBMS may utilize a series of operations to retrieve relevant information in regards to a user query. In this figure, information server 120 is shown accessing information in database storage unit(s) 140. In general, such operations may comprise utilizing a buffer manager module 230 that receives requests for pages, e.g., 'getrequests', and finds those pages in a bufferpool or requests such pages via an I/O operation if the page is not currently in the bufferpool. Once pages have been identified, a data manager component 240 may request the identified pages from the buffer manager, and apply matching and non-matching index predicates as well as simple data predicates to identify relevant information to the query. Simple data predicates are frequently referred to as sargable or "stage 1" predicates. Qualified rows, or rows meeting the conditions of the predicates, are returned from the data manager 240 to the relational data services (RDS) module 250, where more complex "stage 2" predicates are applied. For example, sort and/or hash processing may occur as part of operations performed by RDS module 250 during stage 2. In some embodiments, data manager 240 and relational data system 250 are within the same system or apparatus. In other embodiments, data manager 240 and relational data system 250 may be located in different systems or apparatus, and may be local to or remote from each other. These modules and associated techniques are described in additional detail throughout the specification.

Figure 3:
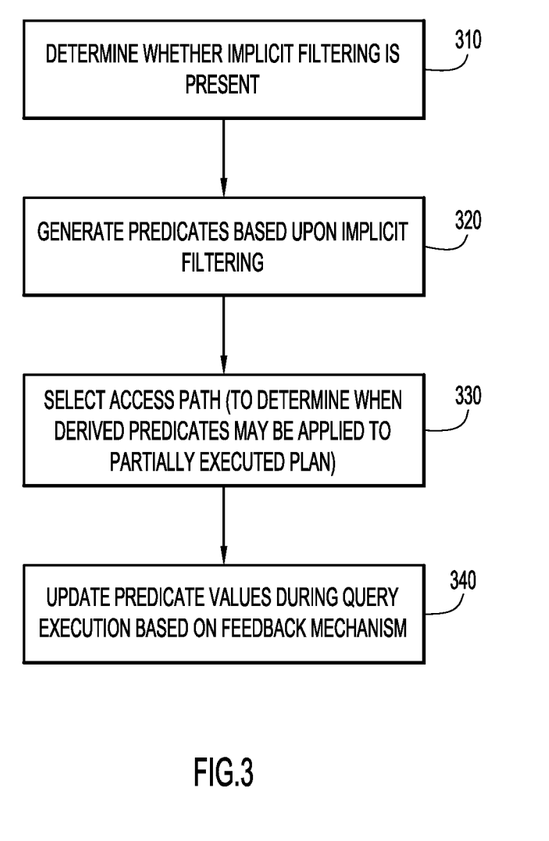
FIG. 3 is a procedural flow chart generally illustrating generating filtering predicates and applying such predicates during query execution, according to an embodiment of the present invention.

Referring to FIG. 3, present invention embodiments provide techniques to generate and apply filtering predicates by partially executing a query and examining the first 'n' qualified rows in a result set to derive a predicate. An example process flow chart is provided in FIG. 3. At 310, an optimization engine determines whether the query, or any portion of the query, contains implicit filtering. At 320, predicates are generated based upon implicit filtering. At 330, an access path is selected, with the access path determining when the derived filtering predicates may be applied during query execution. At 340, predicate values are updated during query execution according to the feedback mechanism to provide additional optimization with regard to filtering data. These operations are described in additional detail below. It is noted that the term "access path" implies a method or way in which to access the data, and "access plan" is a stored representation of a chosen path. In general, "access path" and "access plan" may be used interchangeably throughout this specification.

Implicit filtering, which returns a subset of rows without explicitly coding a property of the query, is shown at 310. Such filtering, e.g., may occur through: (1) removing duplicates, e.g., by performing DISTINCT operations, or by utilizing GROUP BY clauses; (2) limiting a result set to a subset of the qualified rows, e.g., specifying FETCH FIRST n ROWS (possibly in conjunction with ORDER BY operations) or other similar clause that limits the result set to a subset; and (3) specifying other functions that exclude rows qualified by ON, WHERE and HAVING clauses, e.g., MIN/MAX aggregate functions. Typically, implicit filtering does not occur through ON, WHERE or HAVING operations. DISTINCT or GROUP BY operations may include predicate operators that are similar or equivalent to "NOT IN" clauses. Present invention embodiments may apply to other variations of implicit filtering as well, and are not intended to be limited to the specific examples set forth herein.

Once implicit filtering has been identified, predicates may be generated at 320, and may depend on the specific type of implicit filtering being performed. For example, predicate operators may include greater than or less than type operators, such as: "<", "<=", ">", ">=", and "NOT IN" operators. Additionally, predicate operators may include "MIN" functions, in which the predicate operator is "<" or "<=", and "MAX" functions, in which the predicate operator is ">" or ">=".

According to other aspects of the present invention embodiments, the predicate may change from "<=" to "<" once an appropriate number of qualified values have been found. For example, high values of a hexadecimal representation may originally provide a valid value. However, at a subsequent time after query processing begins, such values may be excluded once enough values/results have been returned.

Predicate operands may comprise a "column expression" on the left hand side of the operand, e.g., such as a specific column, and a literal value, e.g., the value "10" on the right hand side of the operand. The left hand side column expression will be determined based on the access path selected, as described in further detail herein. The right hand side literal value will initially be a high or a low value that is not initially filtered out. In some embodiments, the initial right hand side value will be the highest possible value, e.g., hex x"FFFF" or the lowest possible value hex x"0000".

After deriving predicates, an optimization engine may determine how early the derived predicates may be applied, e.g., access points/paths within the partially executed query. A list of possible access points/places, where the derived filtering predicate may be applied, as shown at 330, is as follows.

Access points, listed in order of earliest possible access point to latest possible access point include: (1) Index matching; (2) Index screening; (3) Stage 1 predicate operations; and (4) Stage 2 predicate operations. Index matching predicates reduce the range of index keys scanned, e.g., by specifying a starting and a stopping point. Index screening predicates reduce the number of data pages accessed, e.g., by screening for a particular value. Stage 1 predicates reduce the number of rows passed or fed back for stage 2 processing. Stage 1 predicates generally encompass simple comparisons. Stage 2 predicates reduce the number of rows processed by subsequent plan steps. Stage 2 predicates may also include joins to other tables, as well as computationally expensive operations such as subquery processing, sorting, etc.

During execution of the query, a feedback mechanism at 340, as described herein, may be utilized to update the literal value at 320, so as to filter out increasing numbers of rows as query execution proceeds.

Examples of these derived filtering predicates include: FETCH FIRST n ROWS ONLY with ORDER BY column-expression ASC. Queries involve evaluation of: column-expression<value, where 'value' is the highest qualified value seen by the partially executed query (after at least 'n' values have been seen). It is noted that for ORDER BY DESC, the predicate would be '>' value.

Another example includes: MIN (column-expression), where queries involve evaluation of: column-expression<value. This case is very similar to FETCH FIRST 1 ROW ONLY with ORDER BY ASC, and therefore, the derived filtering predicate is very similar. One difference between these two examples is that the filtering can be derived on the first qualified value, and NULL values must be handled differently (i.e. NULLs are excluded from MIN/MAX but not excluded for FETCH FIRST n ROWS with ORDER BY).

Another example includes: MAX (column-expression), where queries involve evaluation of: column-expression>value, where 'value' is the lowest qualified value seen by the partially executed query. This example is very similar to the "FETCH FIRST 1 ROW ONLY" with "ORDER BY DESC" except in its handling of NULLs.

Yet another example includes: DISTINCT column-expression or GROUP BY column-expression, wherein queries involve evaluation of column-expression NOT IN (list-of-values), where 'list-of-values' is a list of values that have already been seen by the partial execution of the query. The number of values in the list, and the choice of which values to include in the list, can be optimized to ensure that the cost of applying this predicate does not outweigh the benefit of its filtering. For example, very frequently occurring values should be included in the list, while infrequently occurring values should not be included.

The above examples illustrate various examples of implicit filtering, in which determinations of relevant data may be based upon ">", "<" or "NOT IN" operators. Present invention embodiments apply to any such functionality which may be represented by implicit filtering.

Figure 4:
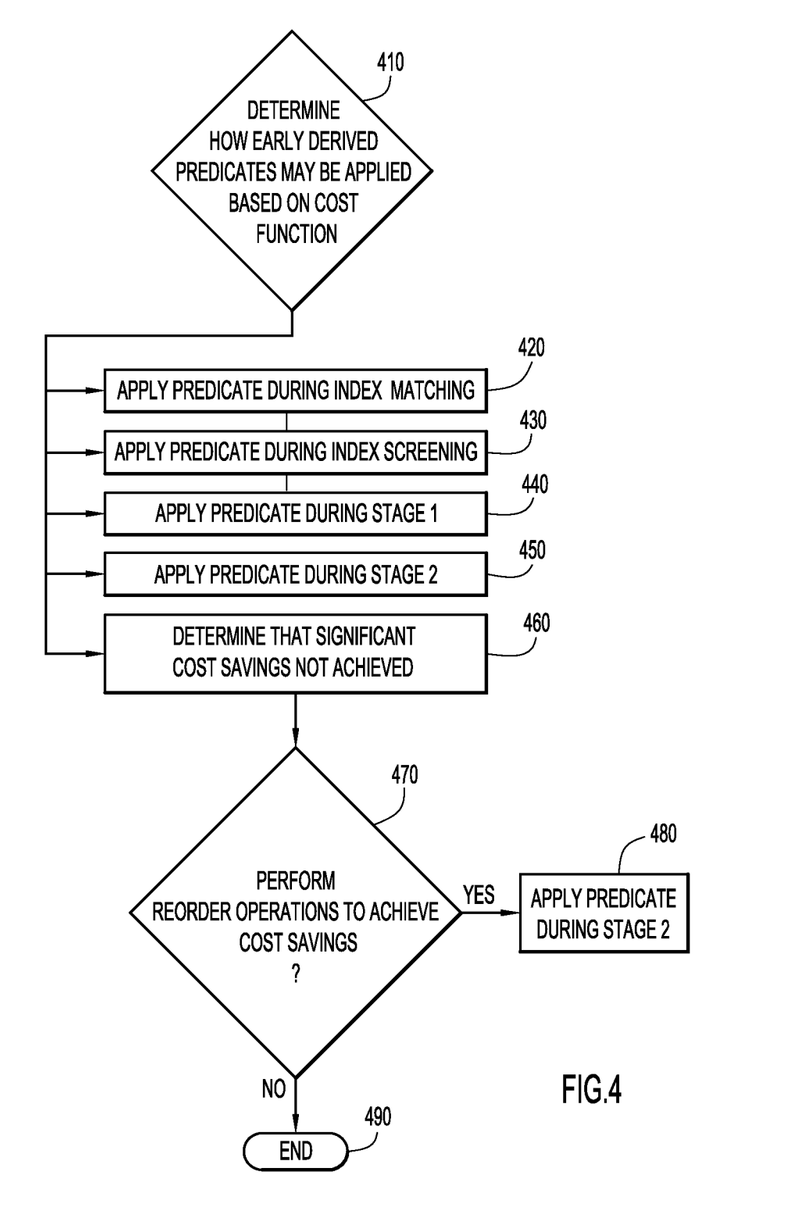
FIG. 4 is a more specific procedural flow chart based upon the flow chart of FIG. 3 and illustrating a manner in which an access path may be selected, according to an embodiment of the present invention.

Referring to FIG. 4, an example process chart is shown for access path selection. As mentioned previously, the choice of access path determines how early, and therefore how effective, derived predicates can be applied during query execution. It is noted that as the amount of processing prior to applying derived predicates increases, the benefits associated from applying such predicates may decrease.

In order to determine which access path to select, a query optimization engine may be utilized. The query optimization engine, in general, should be aware of the derived predicates and be able to factor the derived predicates into the access path selection process. An example flow chart for a query optimization engine is provided in FIG. 4.

At operation 410, the query optimization engine may determine how early a derived predicate may be applied based on a cost function. The optimization engine may determine that an optimal or significant computational improvement is provided at a particular stage of query processing, including: index matching at 420, index screening at 430, Stage 1 predicate evaluation at 440, and stage 2 predicate evaluation at 450.

Alternatively, the optimization engine at 460 may determine that significant improvement is not predicted or estimated by any of these stages, based on the structure of the query. In some embodiments, the optimization engine may perform reordering of operations at 470, e.g., such as altering the manner or order in which tables may be joined, in order to obtain a computational benefit. In this case, if a benefit is estimated or predicted to be achieved, predicates will usually be applied during stage 2 using restructuring operations at 480. Otherwise, access path selection ends at 490.

In some embodiments, the query optimization engine may be cost-based, and may model the execution time behavior of derived predicates. Such a cost-based query optimizer may consider factors including: (1) How many rows need to be processed before the feedback mechanism updates the comparison value and begins to filter out rows yet to be processed; (2) How much filtering is possible through the derived predicates after the initial rows of the result set are processed; and (3) How early the derived predicates can be applied within the overall access path. For example, a lower cost (decreased computational penalty) may be incurred from minimizing the number of rows that are processed before the comparison value is updated. A lower cost may also be incurred from increased amounts of data filtering due to application of the derived predicate.

Regarding the remaining condition, benefits of applying the predicate early in the computational path may depend upon the particular type of query being performed and the characteristics of the data set. In general, the earlier the derived predicates can be applied the better, and the access path chosen will largely determine how early the derived predicates can be applied.

For example, if the access path selected involves a "nested loop join" without any sorting or materialization, which resolves or evaluates an immediate result set into a temporary work area before continuing processing, then it may be possible to apply the derived predicate during scanning of the base table at index matching, index screening or as a Stage 1 predicate. However, if a "sort merge join" is selected, then the derived predicate might only be able to be applied as a stage 2 predicate after the join. Sort merge join operations typically require materialization, that is, either the inner or outer (or both) tables may be sorted and thus materialized into a temporary work area before the join can be processed. This means that the derived predicates are not applied before materialization because the derivation of predicate values occur at a later stage (e.g., after the sort merge join). In order to partially execute the query to obtain the derived filtering predicate, sorting for the sort merge join operation needs to be completed first. In this case, the derived predicate does not reduce the scan of the base tables or the sorting needed for the sort merge join because the corresponding work has already been completed. The derived predicate, however, can still reduce the work yet to be done after the sort merge join, especially if there are additional tables to be joined or other objects that need to be accessed.

Depending on such cost factors, the query optimization engine may be more likely to choose an access path that avoids materializations. Materializations, in many cases, are performed before the derived predicates can be applied to filter out rows, resulting in the derived predicates being less effective at reducing the remaining processing. An access path that avoids materializations would allow the derived predicates to begin filtering out rows earlier and therefore be more effective at reducing computational workload associated with remaining processing. Also, in some embodiments, a query optimizer may be more likely to access a table with derived predicates earlier than a table without derived predicates.

The query optimizer should consider all access path choices, and should factor in the cost benefit of derived predicates on each path. The query optimizer should then select the access path that is estimated or predicted to be the most efficient from a computational workload and time standpoint.

In some embodiments, the sequence of operations may be changed to achieve optimal or improved benefit, as shown at 470. An example of changing the sequence of operations is provided below.

EXAMPLE

```
SELECT ACCOUNT.ID, ACCOUNT.NAME, MAX(SALES.AMT)
FROM ACCOUNT, SALES
WHERE ACCOUNT.ID = SALES.ACCT_ID
GROUP BY ACCOUNT.ID, ACCOUNT.NAME
ORDER BY 3 DESC
FETCH FIRST 20 ROWS ONLY;
```

In this example, the parameter ACCOUNT.ID is a unique index and the parameter SALES.ACCT_ID is a non-unique index.

For this query, an access path may be selected which accesses the ACCOUNT table using the unique index on ACCOUNT.ID. A nested loop join may then be performed to the SALES table using the non-unique index SALES.ACCT_ID. The nested loop join would search through all matching rows in the SALES table to identify the row with the largest SALES.AMT value. Once identified, this row would then be selected for sorting based on the ORDER BY SALES.AMT DESC. (It is noted that this access path avoids a GROUP BY sort, because the unique index on ACCOUN-T.ID was used.) After all rows in the ACCOUNT table have been scanned and joined to the SALES table, then the sort on SALES.AMT DESC may complete and the first 20 rows would be selected.

If derived filtering were to be applied using this access path, according to present invention embodiments, rows in the SALES table could be filtered out earlier using the predicates "SALES.AMT>value", where the value is determined after the first 20 rows of the result set have been passed to the sorting operation. However, in this case, the number of rows in the ACCOUNT table that would need to be scanned would not be reduced.

However, if the join sequence was reversed and the SALES table was scanned first using the non-unique index on SALES.ACCT_ID, and then joined to the ACCOUNT table using the unique index on ACCOUNT.ID, then the derived filtering is much more effective. Having additional filtering on SALES.AMT reduces the number of accesses to the ACCOUNT table needed to arrive at the desired set of data. Accordingly, in this example, the access path changes the join sequence in order to achieve an optimal benefit.

Figure 5:
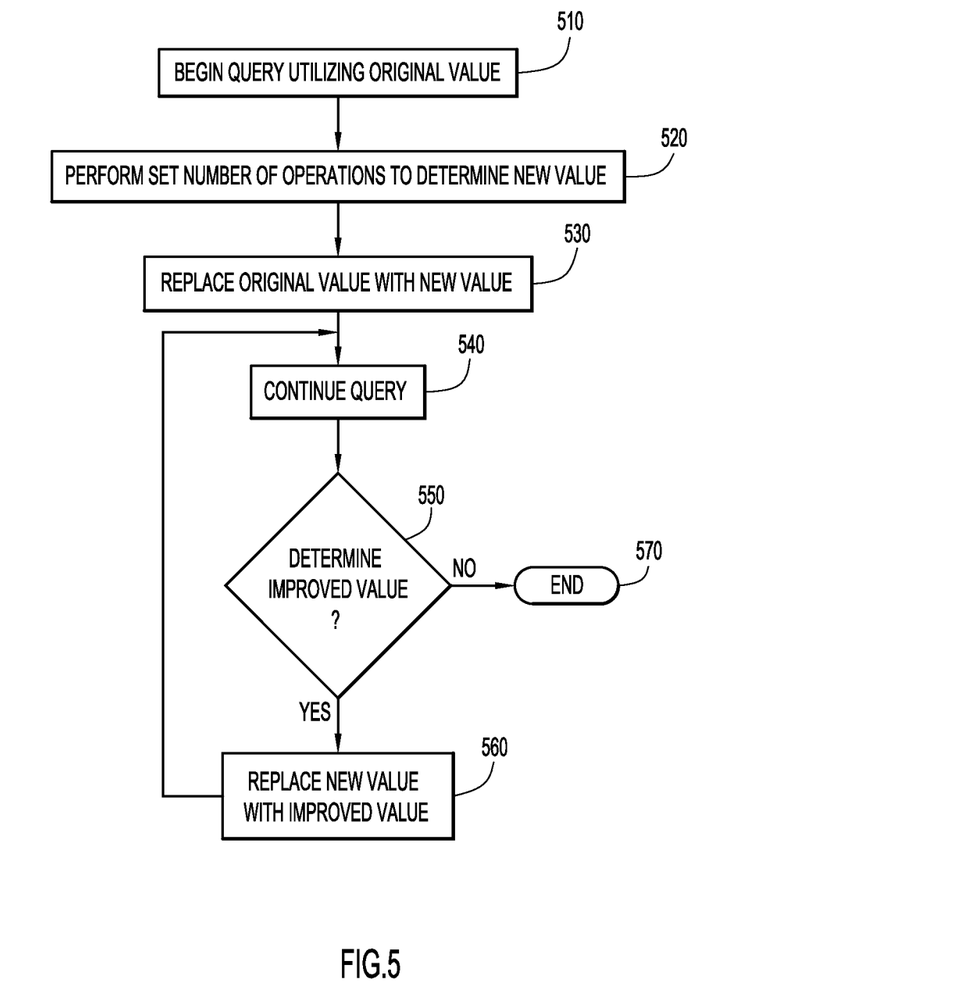
FIG. 5 is a more specific procedural flow chart based upon the flow chart of FIG. 3 and illustrating a manner in which feedback may be applied to update a predicate value, according to an embodiment of the present invention.

FIG. 5 provides a flow chart corresponding to an example feedback mechanism to update predicate values. At 510, query evaluation begins using the original value (e.g., "right hand side" value). At 520, a set number of operations are performed in order to assess whether the original value may be replaced with a new (improved) value. At 530, the original value is replaced with the new value. At 540, query processing continues. At 550, a determination is made as to whether the new query value may be even further improved. At operation 560, if a further improvement may be made, the new value is replaced with the improved value, and the process repeats at 540. Otherwise, the process ends at 570.

For example, for a query involving order by ascending (ORDER BY ASC) and returning a set n number of values (FETCH FIRST n ROWS), as the sort operation writes the top n rows to each output run, the sorting algorithm will feed back the new "high" value to the runtime component. This value may be used to update the predicate value as part of the query to ensure that the next rows will not exceed this value.

In other embodiments, if the sort component is utilizing an in-memory replacement sort, then the "nth" value is tracked by sort as any new value is passed to sort that is lower than the current high value. Therefore, during runtime, the sort operation may feed back a new high value as frequently as each new row is processed.

Figure 6:
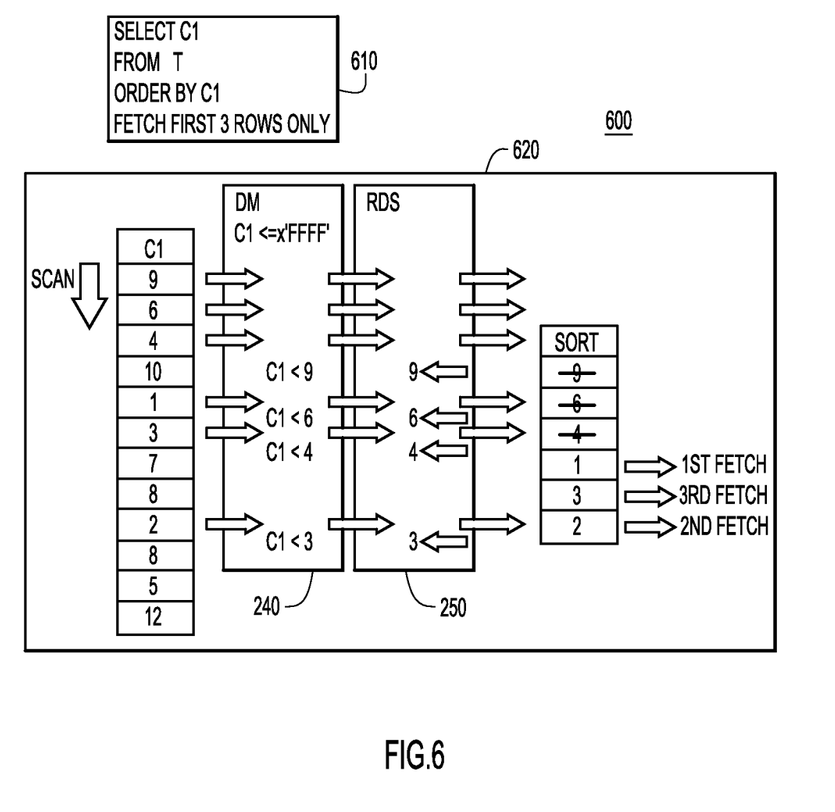
FIG. 6 is an example of utilizing a filtering predicate, according to an embodiment of the present invention.

FIG. 6 provides a more detailed example 600 of ORDER BY and FETCH FIRST operations. The example query 610 requests ORDER BY C1, where C1 refers to a column in a database store, along with FETCH FIRST 3 ROWS ONLY, in order to return the top 3 values of an ascending sort. Therefore, according to present invention embodiments, a predicate would be derived based on matching the ordering of C1 as WHERE C1 <=x'FFFF' to represent hexadecimal high values.

As the data is scanned, the sorting function keeps track of the top 3 rows. In this example, shown at 620, after the first three rows are read, the top three values are 4, 6 and 9. Thus, the sort operation would feed back the current high value of 9 to the predicate value, and the derived predicate becomes C1<9.

Continuing with this example, the next row is scanned, with C1=10, and this value is immediately discarded due to the updated predicate of C1<9. The next row contains the value of '1', which qualifies as less than 9 and is therefore passed from the DM to the RDS to sort. This value displaces the value 9 in the top three values, and the top three values become 1, 4 and 6. At this stage, the maximum value is 6, and therefore, the filtering predicate is updated to C1<6. This process may continue until all rows have been processed. In this example, it is noted that discarded values are not provided to the RDS module 250, thus providing a computational benefit early, at DM 240.

Present invention embodiments also apply to additional query patterns such as selecting a maximum of a column C1 (SELECT MAX(C1)) and/or a minimum of C1 (MIN(C1)). In each case, maximum or minimum is logically equivalent to the combination of ORDER BY C1 FETCH FIRST 1 ROW ONLY, with ascending order set using ASC for MIN, or descending order set using DESC for MAX. Simple maximum and minimum queries do not require sort processing in a RDBMS as it is usually tracked by the RDS component.

According to some aspects of present invention embodiments, the derived predicate may need to allow NULL to be returned, since NULL may be a valid value. For simplicity, this example assumes C1 is defined as NOT NULL.

Additionally, the aforementioned example utilizes an in-memory replacement sort. It is noted that present invention embodiments are not limited to a particular type of sorting, and may be applied to a variety of sorting algorithms, e.g., tournament sort. With a tournament sort, as output runs are written from the tournament tree, a RDBMS will only write as many rows to each output run as the value n from FETCH FIRST n ROWS. For example, with FETCH FIRST 100 ROWS ONLY, at most 100 rows are written to an ordered output run. Thus, sort can keep track of the lowest 100th value of all of the output runs and return this value to RDS 250 and DM 240 to be applied earlier as part of the feedback mechanism. As a new output run is started, if the 100th value is less than the current derived predicate value, then this new value will replace the current value.

Figure 7:
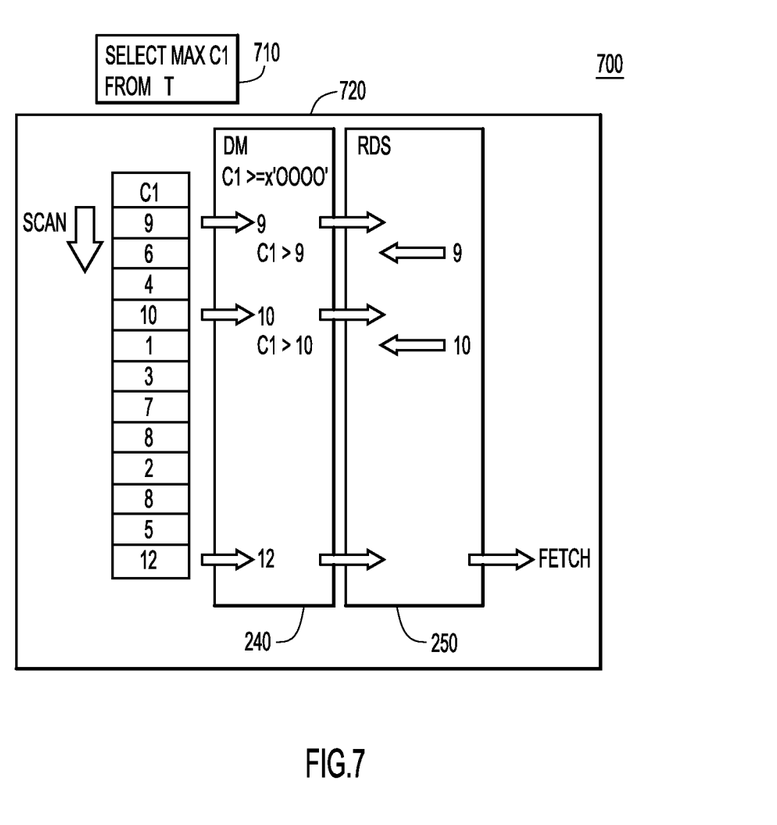
FIG. 7 is another example of utilizing a filtering predicate, according to an embodiment of the present invention.

FIG. 7 utilizes the same data as FIG. 6, and also demonstrates another example 700 of present invention embodiments, including a SELECT MAX operation. Since the query at 710 requests SELECT MAX, then the initial predicate requests any row>=x'0000'.

As shown in 720, the first qualified row has C1 equal to '9', and the value of '9' becomes the current maximum value. Accordingly, the predicate is updated to return only rows with C1>'9', and the updated value is applied at DM 240. Several rows are immediately discarded, e.g., rows with values 6, then 4, which in current RDS systems would be returned only to have RDS discard them. The next qualified row has C1 equal to '10', and this value becomes the new maximum, and thus, the predicate is updated to C1>10. All remaining rows are discarded until the final row, containing C1 equal to '12', qualifies.

As another example, a query may use a GROUP BY operation, and request the MIN(C2) value within each C1 group. Corresponding operations may be represented as:

```
SELECT C1, MIN(C2)
FROM T
GROUP BY C1
```

Assuming an index on C1, the derived predicate becomes:

```
SELECT C1, MIN(C2)
FROM T
WHERE C2 <= x'FFFF'
GROUP BY C1
```

When the first row is retrieved, the C2 predicate is updated. For example, if the first value for C2 equals '10', the predicate would become C2<10. If a row qualifies, then it becomes the new MIN and the predicate is updated. The important difference between this example and the prior examples is that for each change of the GROUP BY column (i.e. a new value for C1 is retrieved from the index), then the derived predicate must be reset back to C2<=x'FFFF'.

A final query example includes DISTINCT or GROUP BY operations without column functions. In this case, the query is to return a unique row given the selected columns. Present invention embodiments may be extended to generate a predicate to discard values that have already been returned. For example, for the operations:

```
SELECT DISTINCT C1
FROM T
```

The initial row must be returned, but after the first row, a generated predicate could be applied to avoid returning the same value as returned based on the initial row. If the first row returns C1 equals 5, then the generated predicate would be C1 NOT IN (5). If the second row returns C1 equals 10 then the predicate becomes C1 NOT IN (5, 10).

This approach does not scale for high cardinality columns, as the NOT IN predicate becomes too large such that the cost of the predicate outweighs the benefit of early duplicate removal. Accordingly, this approach generally applies to low cardinality columns. Alternately, catalog statistics could be used to determine the most frequently occurring values, and this information may be used to limit NOT IN operations against only those values that recur frequently. Likewise, an approach that tracks the most frequently occurring values seen during the scan could be used to determine which values are included in the NOT IN predicate and which are not.

This approach does not exclude all duplicates, but can reduce the number of duplicates that flow into the sorting operation. The same techniques may apply when an index applies partial order, as the NOT IN could track the last n values.

When DISTINCT or GROUP BY operations are combined with FETCH FIRST, and ORDER BY is not specified, then ordering of the result is not important. Therefore, deriving a NOT IN predicate can be cost effective regardless of column cardinality when the cost of applying a long NOT IN predicate outweighs the savings of reducing the number of rows that need to be scanned. As an example:

```
SELECT DISTINCT C1
FROM T
FETCH FIRST 3 ROWS ONLY
```

The above example requests the first 3 unique rows, and since order is not important, then as soon as 3 unique rows are processed, then the query can end. If the first row returned C1 equals '5', then the generated predicate would be C1 NOT IN (5). If the second row returned C1 equals '10', then the generated predicate becomes C1 NOT IN (5, 10). Once the third qualified row is retrieved, for example, having C1 equals '7', then the query can end returning 5, 10, and 7 as the result.

Feedback predicates may also be pushed down through or across union legs. For example, the following code segment demonstrates an embodiment of the present invention in conjunction with UNION ALL operators:

```
SELECT MAX(C1)
FROM
(SELECT * FROM T1
UNION ALL
SELECT * FROM T2) AS V1
```

The above example selects a maximum value of C1, e.g., MAX(C1) from a table expression that contains a UNION ALL operator. The particular implementation of pushing predicate values down through or across UNION legs, is dependent upon the method that the RDBMS uses to further process the UNION ALL legs. For example, if UNION ALL legs are processed serially, then initially, a predicate is derived, e.g., WHERE C1>=x"00", for each UNION ALL leg. As the rows are processed for the first leg, the predicate value is updated as described herein. At the completion of the first leg, the MAX(C1) value can be used to update the derived predicate of the second leg. For example, if the value of MAX(C1) from the first leg is 100, then the predicate for the second leg becomes WHERE C1>100. As the rows continue to be processed, this value is continually updated.

In accordance with another embodiment of the invention, UNION ALL legs may be processed in parallel, independently from each other. Accordingly, the derived predicate may be applied within each independent leg. A parent of the parallel tasks may be able to use the resultant derived predicate values from each leg to filter out rows returned from each parallel child task as the results are merged by the parent.

In accordance with yet another embodiment of the invention, UNION ALL legs may be processed concurrently in a "round-robin" approach. In such approaches, the derived predicate value from the first leg can be used to update the predicate used to fetch rows from the second leg. For example, assuming leg 1 has rows 10, 5, 12, 7 and leg 2 has rows 8, 11, 9, 15, then the first fetch from leg 1 would retrieve the value of 10, and the derived predicate becomes C1>10. Similarly, a fetch beginning from leg 2 ignores the first row and fetches the second row, having a value of 11, which is greater than 10. The derived predicate is updated to C1>11 and the fetch returns to leg 1. Accordingly, this round-robin style may continue in a similar manner until processing is complete.

This derived predicate approach applies to all UNION ALL combinations with DISTINCT, GROUP BY, FETCH FIRST (with or without ORDER BY) and MAX or MIN operations. Present invention embodiments are not intended, however, to be limited by these embodiments. As described herein, the processing of the derived predicates is dependent on whether the UNION ALL legs are processed serially, independently in parallel, or in a round-robin style.

Figure 8:
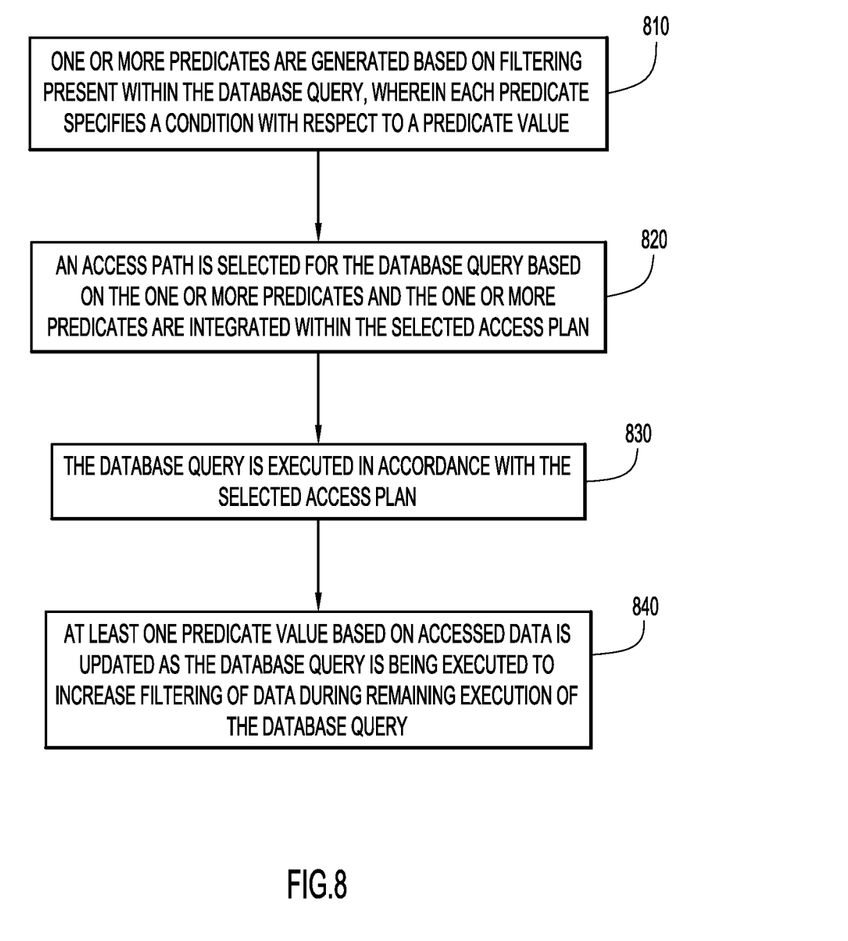
FIG. 8 is a more general procedural flow chart of deriving and utilizing a filtering predicate according to an embodiment of the present invention.

FIG. 8 provides a generalized flowchart according to present invention embodiments. At 810, one or more predicates are generated based on filtering present within the database query, wherein each predicate specifies a condition with respect to a predicate value. At 820, an access path is selected for the database query based on the one or more predicates and the one or more predicates are integrated within the selected access plan. At 830, the database query is executed in accordance with the selected access plan. At 840, at least one predicate value based on data accessed is updated, as the database query is being executed, to increase filtering of data during remaining execution of the database query.

Figure 9:
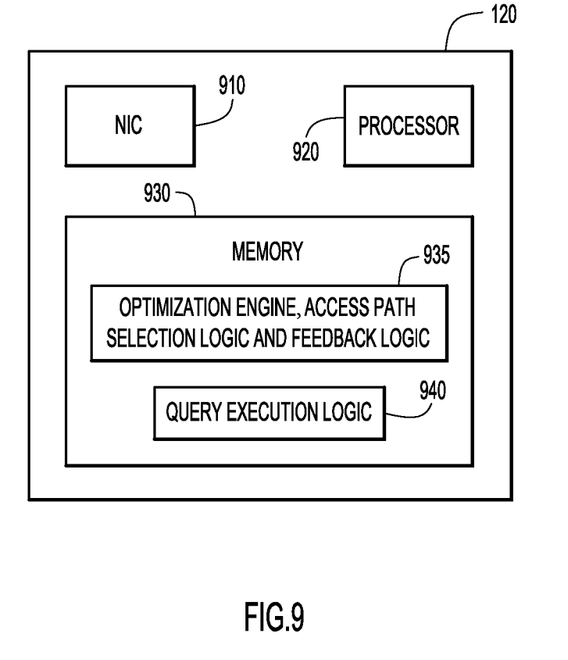
FIG. 9 is an example of an apparatus (e.g., information server) according to an embodiment of the present invention.

Referring to FIG. 9, an example embodiment of an information server 120 may comprise a network interface 910, a processor 920 and a memory 930. The network interface unit 910 is configured to enable network communications over network 130 e.g., to facilitate communication between information server 120 and host server 110 regarding query requests from client system 100 as shown in FIG. 1.

The processor 920 may be embodied by one or more microprocessors or microcontrollers, and executes computer readable program instructions stored in memory 930 to perform the operations described above in connection with FIGS. 1-8.

Memory 930 may comprise computer readable storage media encoded with software comprising computer readable program instructions, and when the software is executed by the processor 920, the processor 920 is operable to perform the operations described herein in connection with query execution and optimization engine logic 935 and 940. Predicted or estimated computational costs, as determined from a cost function, may also be stored in memory 930.

Module may include one or more modules or units to perform the various functions of present invention embodiments described throughout this specification. The various modules (e.g., optimization engine logic 935 and query execution logic 940,) may be implemented by any combination of any quantity of software and/or hardware modules or units, and may reside within memory 930 of the server for execution by processor 920.

Present invention embodiments may also be applied to processing data in parallel (e.g., parallel processing) to achieve performance benefits.

It will be appreciated that the embodiments described above and illustrated in the drawings represent only a few of the many ways of implementing embodiments for the techniques disclosed herein.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., optimization engine logic 935, query execution logic 940, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., optimization engine logic 935, query execution logic 940, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., query results, computational costs, etc.). The database system may be implemented by any number of any conventional or other databases, data stores or storage structures (e.g., files, databases, data structures, data or other repositories, etc.) to store information (e.g., query results, computational costs, etc.). The database system may be included within or coupled to the server and/or client systems. The database systems and/or storage structures may be remote from or local to the computer or other processing systems, and may store any desired data (e.g., query results, computational costs, etc.).

The present invention embodiments may employ any number of any type of user interface (e.g., Graphical User Interface (GUI), command-line, prompt, etc.) for obtaining or providing information (e.g., query results, computational costs, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, etc.).

The present invention embodiments are not limited to the specific tasks or algorithms described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of executing a database query comprising:
generating one or more predicates based on implicit filtering present within the database query, wherein each of the one or more predicates specifies a condition with respect to a respective predicate value;
selecting an access path for the database query based on the one or more predicates and integrating the one or more predicates within the selected access plan;
executing a set number of operations of the database query in accordance with the selected access plan; and
repeatedly updating the respective predicate value of at least one predicate of the one or more predicates based on data accessed, wherein the updating increases filtering of data, and executing the database query until the filtering of the data cannot be improved by an updated predicate value.

2. The method of claim 1, wherein the filtering present within the database query includes one or more from the group consisting of FETCH FIRST or FETCH FIRST with one or more of ORDER BY, MIN, MAX, DISTINCT, GROUP BY, and UNION.

3. The method of claim 1, wherein the condition for a predicate is specified by an operator and the respective predicate value.

4. The method of claim 3, wherein updating the predicate value of at least one predicate includes:
   updating the respective predicate value of the at least one predicate with an accessed data value based on accessed data satisfying the condition of the at least one predicate.

5. The method of claim 1, wherein selecting an access path for the database query includes:
   selecting the access path with minimum materializations.

6. The method of claim 1, further comprising:
   reordering an order of applying join operations prior to selecting the access path for the database query.

7. The method of claim 1, further comprising:
   selecting the access path based upon a cost function that determines an optimal time during query execution to apply the generated one or more predicates.

* * * * *